Dec. 27, 1966     E. C. LETTER     3,294,469
OPTICAL SHUTTERS
Filed Jan. 26, 1962
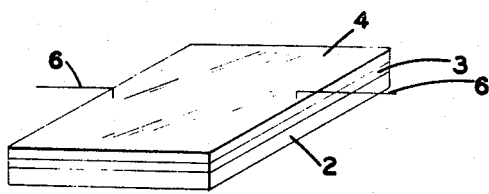
FIG. 1
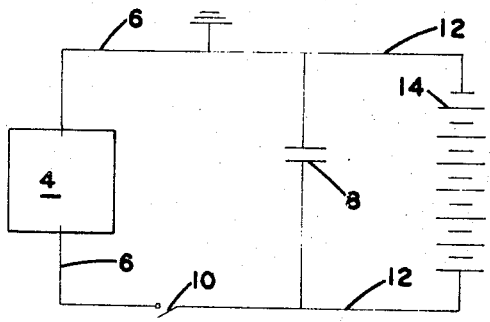
FIG. 2
FIG. 3
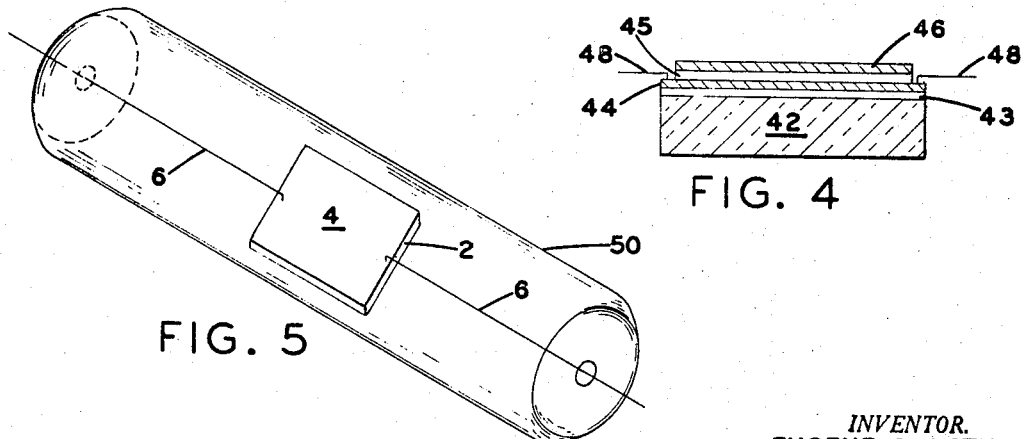
FIG. 4
FIG. 5
INVENTOR.
EUGENE C. LETTER
BY Frank C. Parker
David Dougherty
ATTORNEYS

United States Patent Office 3,294,469
Patented Dec. 27, 1966

---

3,294,469
OPTICAL SHUTTERS
Eugene C. Letter, Walworth, N.Y., assignor to Bausch & Lomb Incorporated, Rochester, N.Y., a corporation of New York
Filed Jan. 26, 1962, Ser. No. 168,974
6 Claims. (Cl. 350—160)

This invention relates to an optical shutter and more particularly to an improved optical shutter or light valve. The present invention is an improvement of my copending application for a "High Speed Optical Shutter," Serial No. 159,105 filed December 13, 1961, now abandoned, which is assigned to the same assignee as the present application.

Studies of combustion, corona discharge, explosions, plastic and elastic deformation and shock wave phenomena frequently call for detailed photographs taken at shutter speeds of a few microseconds. Ballistics dynamic testing and chemical reactions also require pictures taken at similar speeds.

At relatively high speeds, it is desirable to shutter a relatively large aperture. The relatively large aperture is desirable since it allows adequate light to enter the optical shutter during the relatively short time intervals.

A high speed optical shutter according to the present invention may be opened or closed in less than 25 microseconds. In some cases the opening or closing speed approaches one microsecond. A system of this type may be used in combination with framing cameras. Further, because of the relatively large aperture therein i.e. approximately 1" square, the devices are particularly applicable in any area requiring a relatively high speed light valve.

Advantageously, a shutter or light valve according to the invention may be triggered by an event itself. For example, a flash of light may be used to trigger the valve or electronic means my be incorporated for that purpose.

Briefly, an optical element according to the present invention includes a mirror comprising a substrate having an anti-reflecting dielectric film such as magnesium fluoride, and an electrically conducting thin film deposited thereon. The electrically conducting film is separated from the substrate by the dielectric film. The electrically conducting thin film is operatively connected to means for producing a high voltage discharge. The electric discharge passing through the electrically conducting film destroys the reflectivity of the film to thereby change the condition of the shutter.

In some cases it is desirable to place the opaque or reflecting surface i.e. the electrically conducting thin film and substrate in an inert gas. Helium has been found to be the most desirable of the inert gases, however, air is also a satisfactory atmosphere.

A second embodiment of the invention includes a layer of an ammonium halide. The ammonium halide is placed between the electrically conducting thin film and the anti-reflecting dielectric film to obtain improved results.

A third embodiment of the invention includes two layers of an electrically conducting thin film such as aluminum and/or magnesium separated by a relatively thin intermediate dielectric film. The optical density of the film may be significantly increased without requiring a similar increase in voltage discharge for removing the film. A second dielectric film separates the first electrically conducting film from the substrate.

The dielectric film deposited on the substrate is approximately ¼ wavelength thick. The wavelength used to indicate the optical thickness is near the middle of the spectral region over which improved transmission is desired. For example, a ¼ wavelength optical thickness selected from near the middle of the visible region of the spectrum would improve the transmission of visible light.

Advantageously, the dielectric film acts as an anti-reflectent. It is also contemplated to deposit $SiO_2$ on a high index glass in order to obtain advantageous results.

It is presently theorized that the burned effect is caused by residual organic matter on the substrate. The brown film has a relatively high reflectance and is therefor undesirable. Since the dielectric film provides an exceptionally clean surface on which the electrically conducting film is deposited, this tends to eliminate the effect caused by residual organic material.

A second theory for explaining the more complete removal of the electrically conducting film is that the bond between the electrically conducting thin film and the dielectric film is less than a similar bond between an electrically conducting film and glass. Therefore, the material is more easily removed. The above theories are unproven and merely set forth what is presently believed to explain the phenomena.

The invention will now be described in connection with the accompanying drawings; in which, FIG. 1 is a perspective view showing a shutter according to the first embodiment of the invention;

FIG. 2 is a schematic illustration of the first embodiment of the invention including means for opening or closing the shutter;

FIG. 3 is a cross sectional view illustrating a second embodiment of the invention;

FIG. 4 is a cross sectional view illustrating a third embodiment of the present invention; and, FIG. 5 is a perspective view illustrating a shutter according to the first embodiment of the invention disposed in an inert atmosphere.

The first embodiment of the invention will be described in connection with FIGS. 1 and 2 wherein like reference numerals have been used to indicate similar parts. A substrate 2 preferably of glass has a relatively thin dielectric film 3 deposited thereon. A relatively thin electrically conducting film 4 is deposited on top of the dielectric film 3. The film 4 may consist of aluminum, magnesium, an alloy containing aluminum or magnesium or some other suitable material such as silver. The preferred embodiment incorporates an aluminum film; however, magnesium is satisfactory from a commercial standpoint. Silver is satisfactory, however, particularly thin films must be used. The glass surface should be properly cleaned prior to deposition in order to remove substantially all of the foreign matter thereon to thereby achieve a more uniform film.

The thin film 4 is connected by leads 6 in parallel with a capacitor 8 when a switch 10 is closed. The capacitor 8 is connected by the leads 12 to electrical means 14 for producing a high voltage electrical discharge of between 2000 and 10,000 volts. The capacitor 8 in one embodiment of the invention has a capacitance of between $\frac{1}{10}$ and two microfarads. The capacitor is charged by the high voltage supply 14 and discharges across the film 4 when the switch 10 is closed. The electric discharge passing through the film 4 destroys the film 4 to thereby open or close the shutter.

A second embodiment of the invention shown in FIG. 3 includes an intermediate layer 32 of ammonium halide which separates the electrically conducting film 34 and a dielectric film 31. The dielectric film 31 acts as an anti-reflectent and is generally deposited directly onto the substrate 30. The ammonium halide, preferably ammonium chloride may be applied by spinning techniques. For example, the ammonium chloride may be dissolved in a liquid, such as isopropylalcohol, and applied to a glass substrate 20. The substrate is placed in a high speed centrifuge and subsequently the solvent is removed by evaporation leaving the layer 32 of ammonium halide on the glass substrate 30. The substrate 30 having the film 32 thereon is placed in a vacuum chamber and the thin electrically conducting film 34, preferably aluminum, is deposited on top of the film 32. The ammonium halide film has been found to improve the removal of the metal film by the electric discharge.

FIG. 4 illustrates a third embodiment of the invention. A glass substrate 42 has two relatively thin electrically conducting films 44 and 46 and two relatively thin dielectric films 43 and 45 deposited thereon. The dielectric film 43 is deposited on the substrate 42 intermediate of the substrate 42 and film 44. The dielectric film 45 is deposited in between the films 44 and 46. Separating the two films 44 and 46 by a relatively thin intermediate dielectric film 45 has been found to have superior characteristics for various applications. For example, the optical density of the film may be significantly increased without requiring a similar increase in voltage discharge for removing the film. Further, since a relatively smaller voltage discharge is required for removing the film, the flash emitted as the electrically conducting film is destroyed is less intense than the corresponding flash for removing a single layer of similar optical density. In the third embodiment of the invention the electric leads 48 are connected to the film 44. The film 46 is electrically insulated from the film 44 by the intermediate layer 48.

A glass substrate 2 having an aluminum film 4 deposited thereon may be disposed in an inert gas as illustrated in FIG. 5. The aluminum film 4 is separated from the substrate 2 by a dielectric film (not shown). In FIG. 5 the film 4 is connected by the leads 6 to the outside of an envelope 50. The envelope 50 contains an inert gas. The leads 6 extend through the envelope 50. The leads 6 are connected to a capacitor and voltage supply (not shown) according to the schematic diagram shown in FIG. 2.

In making a shutter according to the first embodiment of the invention, it has been found desirable to evaporate the magnesium fluoride in two stages. For example, a one quarter-wavelength thick layer of magnesium fluoride is deposited in a few minutes on the glass surface using conventional glow discharge and/or baking techniques. Thereafter, the substrate is exposed to the atmosphere and cooled. Subsequent to this step a second relatively thin film preferably less than one quarter wavelength is deposited on the first layer, the second layer is deposited relatively slowly, i.e. over a period of from one half to one hour while the source is maintained at a relatively low temperature.

While several embodiments have been illustrated in the specification it will be understood these forms are shown for purposes of illustration. The illustrated forms may be modified and embodied in various other forms or employed in other uses without departing from the spirit or the scope of the appended claims.

What is claimed is:

1. An optical element comprising a substrate, an electrically-conducting reflective metal film, an anti-reflecting dielectric interference film separating the substrate and the metal film, and means for producing a high-voltage electrical discharge across the metal film whereby the reflectivity of the optical element is destroyed.

2. An optical element according to claim 1; in which, the dielectric film consists essentially of magnesium fluoride.

3. An optical element according to claim 2; in which, the magnesium fluoride film has an optical thickness of ¼ wavelength in the spectral region.

4. An optical element according to claim 3; in which, the electrically conducting thin film consists essentially of a thin film taken from the group of aluminum and magnesium.

5. An optical element according to claim 1; in which, a thin layer of an ammonium halide separates the electrically conducting thin film and the dielectric film.

6. A high speed shutter comprising a mirror and means for producing a high voltage discharge, said mirror including a glass substrate, a first layer consisting essentially of an antireflecting dielectric thin film and a second layer consisting essentially of an electrically conducting thin reflective film, said first and said second layers deposited on said substrate, said dielectric film separating said electrically conducting film from said substrate, a second dielectric film and a second electrically conducting film, said second dielectric film separating said second electrically conducting film from said first electrically conducting film, and means for electrically connecting said first electrically conducting film to said high voltage means whereby the electric discharge passing through said film destroys the reflectivity to thereby change the condition of said shutter.

References Cited by the Examiner

UNITED STATES PATENTS

| 2,401,443 | 6/1946 | Weinrich | 88—69 X |
| 2,464,279 | 3/1949 | Zarem et al. | 95—53 X |
| 2,750,832 | 6/1956 | Morgan | 88—105 X |
| 3,213,752 | 10/1965 | Ruderman | 88—61 |

OTHER REFERENCES

Electronics, February 1954, pp. 198, 200 and 202.
Muirhead et al., Review of Scientific Instruments, vol. 32, No. 10, October 1961, pp. 1148–49.

JEWELL H. PEDERSEN, *Primary Examiner.*

J. L. CHASKIN, W. L. SIKES, *Assistant Examiners.*